UNITED STATES PATENT OFFICE.

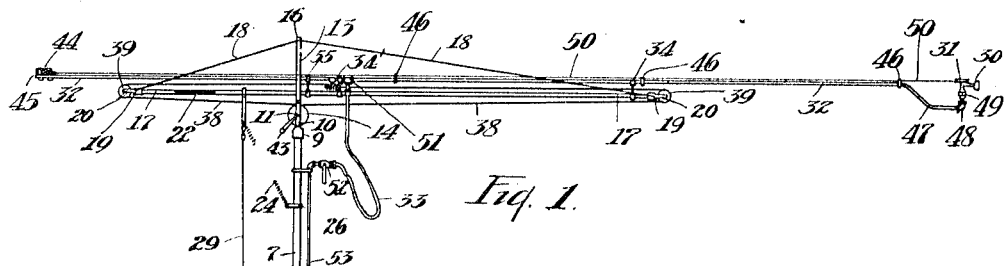

FORREST G. HAYES, OF SHARON, PENNSYLVANIA.

TREE-SPRAYER.

1,073,852.

Specification of Letters Patent.   Patented Sept. 23, 1913.

Application filed May 15, 1911. Serial No. 627,374.

*To all whom it may concern:*

Be it known that I, FORREST G. HAYES, a citizen of the United States, residing at Sharon, in the county of Mercer and State of Pennsylvania, have invented certain new and useful Improvements in Tree-Sprayers, of which the following is a specification.

My invention relates to improvements in a tree sprayer and particularly to improvements over the structure of a tree sprayer heretofore patented by myself under U. S. Patent No. 950,916, dated March 1st, 1910. In the above patented structure there have been found to be several matters of detail which were disadvantageous in the practical operation of my tree sprayer. One of these was the manner in which the hose is connected to the main feed pipe, the arrangement as shown in the prior patent being such as to render the operation of my sprayer difficult, rendering the entire appliance cumbersome and awkward for handling.

Another feature found desirable and not present in the prior patent is an arrangement by which the nozzle can be pointed in any direction whatever.

A still further improvement in the present invention resides in the method of mounting the sliding pipe on the boom and means for facilitating the turning of the main supply pipe in the supporting bracket heads.

Still further objects and purposes of the present invention will appear from an inspection of the drawings, the specification describing the same, and the claims appended thereto in which are set forth the combinations of elements, arrangement of parts, and novel structural details properly comprised within the scope of the same.

Referring now to the drawing in which is shown a preferred construction of my improved tree sprayer, Figure 1 is a side elevation of my tree sprayer constructed in conformity with the improvements contemplated in the present invention. Fig. 2 is a plan view of the end portions of the supply pipe showing the method of operating the nozzle. Fig. 3 is a full sized side elevation of my bracket and wrench housing showing in the latter, partially in outline, my jawed wrench, the boom and supply pipe being shown in cross section. Fig. 4 is an end elevation of the structure shown in Fig. 3. Fig. 5 is a fragmentary side elevation of my improved nozzle showing thereon a sheave by which this nozzle is turned.

In the several figures of the drawing in which like reference characters designate like parts, (5) is the sprayer base having secured thereto a wide spread flange (6), with the central boss portion in which the pedestal (7) is mounted. Suitably secured to the upper end of this pedestal is a tubular socket (9) in which a member (10) is rotatably mounted, the mounting being such as to permit the mast (13) and structure carried thereon to be swung in a horizontal plane, relatively to the pedestal (7). Mounted on the member (10) is the pulley (14) having a crank arm (11) extending through the lower portion of the mast affording a bearing therein, the crank arm terminating in the handle (43). The mast (13) is connected to the member (10) by means of a bolt for the purpose of permitting the mast and the structure hinged thereon to be swung in a vertical plane as in the prior patent. Rigidly secured to the mast intermediate the length of the mast is a boom (17) having vertically disposed pulleys (39) mounted within the brackets (20) at either end thereof. For the purpose of strengthening and sustaining the weight of this boom, I provide guy wires (18) connecting the upper end of the mast (16) with the inner ends (19) of the pulley brackets (20). In the forward part of the boom, I provide two stationary brackets (34 and 34'), the former being positioned near the front end of the boom, and the latter, on that portion of the boom just forward of the mast. These brackets are provided with bracket heads in which the supply pipe (32) is adapted to slide. Extending downwardly from the rear portion of the boom, I have a hanger which is connected by means of a spiral spring (24) to the pedestal. Extending downwardly from the hanger is a rope or wire (29) connected at its lower end to a foot pedal (28). The structure thus far described is substantially the same as that disclosed in my prior patent.

Intermediate the ends of the supply pipe (32) and between the two stationary brackets, I provide a T (51) extending from which is a flexible hose (33) connected at its other end to a suitable cock (52). This cock is connected to the upper end of a pipe (53) which is suspended from the pedestal and extends parallel therewith, the lower end of the pipe being provided with a coupling (54) for connection to a fluid supply. Between the mast and the bracket (34') I secure, by means of a screw (61) a bracket (55) to the boom (17). Referring now to Figs. 3 and 4 particularly, it will be seen this bracket comprises the lower portion (59) adapted to closely embrace the boom (17) and to be secured thereto by means of the set screw (61). Extending upwardly from the lower portion (59) is an arm having the aperture (58) therein and terminating in a head (62) consisting of two sides (56) which afford a housing for my wrench. I provide alined apertures (57) in the sides (56), these apertures being of greater diameter than my supply pipe (32) which is adapted to rest therein. Seated within the wrench housing and loosely embracing the supply pipe is a wrench (63) comprising side members (63) which are integrally connected at one side for a distance comprising approximately one half their circumference and terminating in projections. These projections are connected by a rivet (65) in which is journaled the wrench handle (66) and at the inner end the serrated jaw (67). It will be observed from this construction that by lifting up the handle (66) the jaw (67) will grasp the supply pipe (32) and a continued lift of the handle (66) will turn the pipe. Upon releasing the handle, it will, by its own weight, drop against the bracket (55) and the supply pipe, now subject only to the weight of the T (51) and the connecting hose will return to its initial position. A rope (38) is connected at either end of the supply pipe to the T (51) and extending through apertures, such as 58 in the brackets, passes around the end pulleys (39) and around the crank pulley (14). As in my prior construction, upon turning this handle in one direction, the supply pipe is run outwardly, and in turning the handle in the other direction, it is returned. While the supply pipe is in the rearmost position, it can be turned in its brackets by grasping the T (51), but in that this T is out of reach of the operator when the supply pipe is run forwardly, I provide my jawed wrench construction to facilitate the turning of the supply pipe without necessitating the operator changing his position relative to the sprayer base; and it will be readily seen that in my wrench construction, I have provided practical means for turning the supply pipe, this means being operative at a point adjacent the mast and equally effective irrespective of the point to which the supply pipe has been slid along the boom. The outer end of the supply pipe is bent downwardly and then parallel to itself, as at 47, and provided with the elbow (48) which is connected to a swivel joint (49) in which the end nozzle (30) is adapted to turn. Secured to this nozzle is a sheave (31). At the opposite end of the supply pipe and in a plane parallel to the sheave, I mount the pulley (44) in the bracket (45). A rope, wire or chain (50) extends about the pulley (44) around the sheave (31). Mounted on the supply pipe (32) are guides (46) through which the rope (50) passes. This rope which extends along the entire length of the supply pipe may be grasped at any point by the operator for the purpose of rotating the sheave and nozzle therewith.

It will thus be seen that by means of the improvements embodied in my present construction, the operator need not move from his position adjacent the base in order to manipulate all parts of the sprayer.

I claim—

1. A tree sprayer comprising a base, a boom mounted thereon and adapted to swing in horizontal and vertical planes, a plurality of brackets fixed to said boom, a supply pipe slidably mounted on said brackets, and means, in one of said brackets, for rotating said supply pipe.

2. A tree sprayer comprising a base, a boom mounted thereon and adapted to swing in horizontal and vertical planes, a supply pipe slidably mounted on said boom, and means, operative at a fixed point relative to the base, to rotate said supply pipe irrespective of the position to which said supply pipe is slid.

3. A tree sprayer comprising a base, a boom mounted thereon and adapted to swing in horizontal and vertical planes, brackets mounted on said boom, a supply pipe slidably mounted on said brackets, and a jawed wrench mounted in one of said brackets and embracing the supply pipe.

4. In a tree sprayer the combination of a base comprising a platform, a pedestal, a member rotatably mounted on the pedestal, and a mast mounted on said member and adapted to swing relative thereto, a boom suspended from said mast, a plurality of brackets fixed to said boom, and a supply pipe slidably mounted on said brackets, means for supplying fluids to said supply pipe at a point intermediate its ends, a nozzle having a swivel joint on the end of said supply pipe, means located adjacent said mast for rotating said supply pipe, and means operative from any point along said supply pipe for rotating said nozzle.

In testimony whereof I have affixed my signature in presence of two witnesses.

FORREST G. HAYES.

Witnesses:
 EUGENE E. ANDERSON,
 FRED A. SERVICE.

Copies of this patent may be obtained for five cents each, by addressing the "Commissioner of Patents, Washington, D. C."